United States Patent [19]

Eldeen

[11] 4,295,638
[45] Oct. 20, 1981

[54] NEWAL POST ASSEMBLY

[76] Inventor: Gene H. Eldeen, 521 Oak St., Farmington, Minn. 55024

[21] Appl. No.: 123,841

[22] Filed: Feb. 22, 1980

[51] Int. Cl.³ .......................................... E04H 17/14
[52] U.S. Cl. ...................... 256/59; 52/256; 403/262
[58] Field of Search .............. 52/292, 296; 256/59, 256/65; 403/189, 187, 262

[56] References Cited

U.S. PATENT DOCUMENTS

| | | | |
|---|---|---|---|
| 708,936 | 9/1902 | Strom | 52/292 |
| 723,669 | 3/1903 | Hammann | 52/292 |
| 2,820,262 | 1/1958 | Dunn | 52/298 |
| 3,253,373 | 5/1966 | Diack | 52/292 |

Primary Examiner—Andrew V. Kundrat
Attorney, Agent, or Firm—Burd, Bartz & Gutenkauf

[57] ABSTRACT

A newal post assembly to locate a newal post at any desired necessary location in a secure and sturdy manner. The assembly includes a newal post for intended use in a generally upright orientation, and a newal post anchor plate or base assembled to the transverse bottom surface of the newal post. The base includes a plurality of first holes upwardly countersunk from the bottom of the base and a plurality of fasteners fastened through the first holes to secure the newal post to the base. A plurality of second holes are located in surrounding relationship to the first holes and are downwardly countersunk and accommodate a plurality of second fasteners for securing the base to a floor type surface.

9 Claims, 7 Drawing Figures

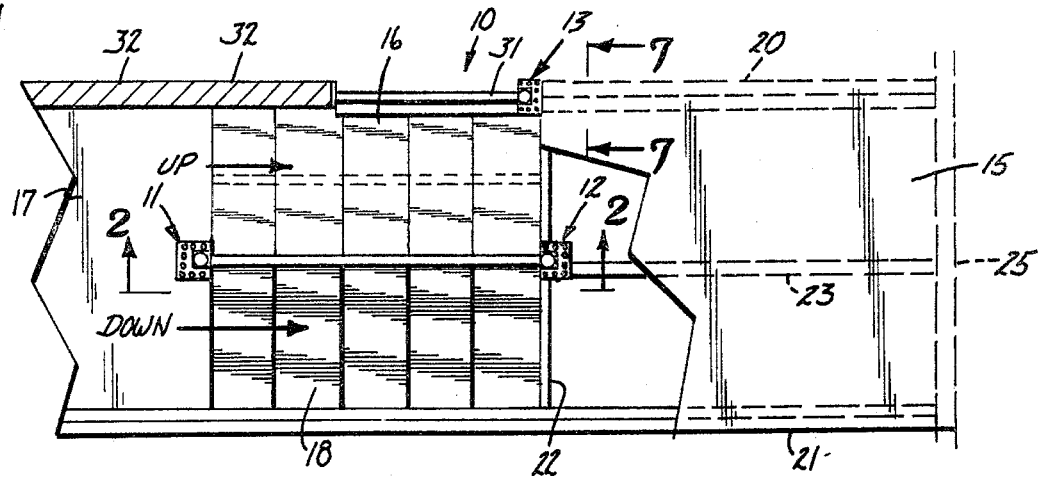
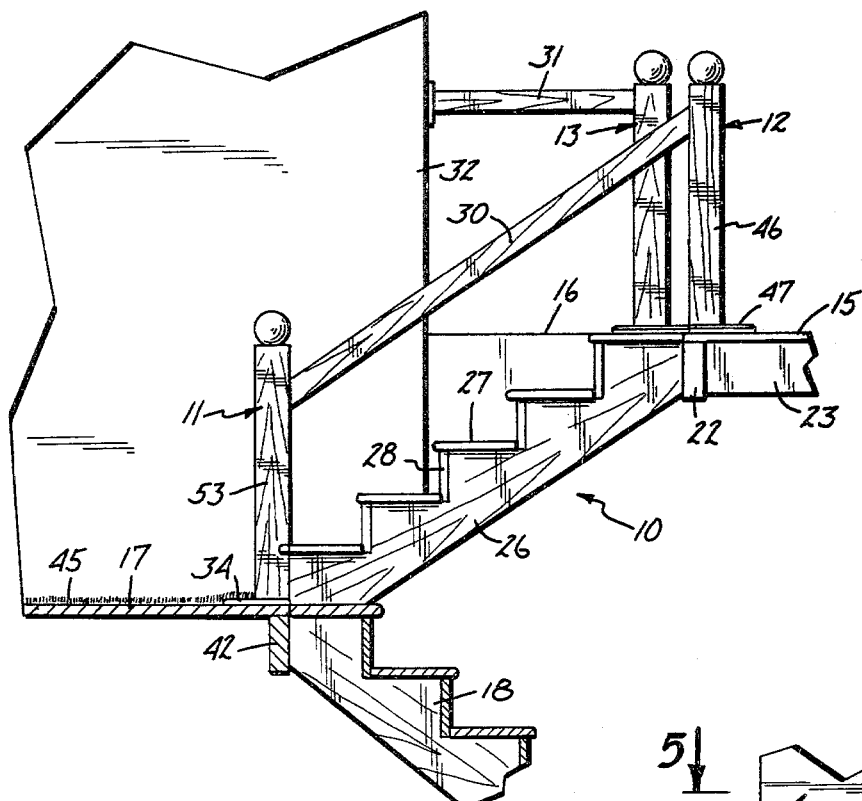
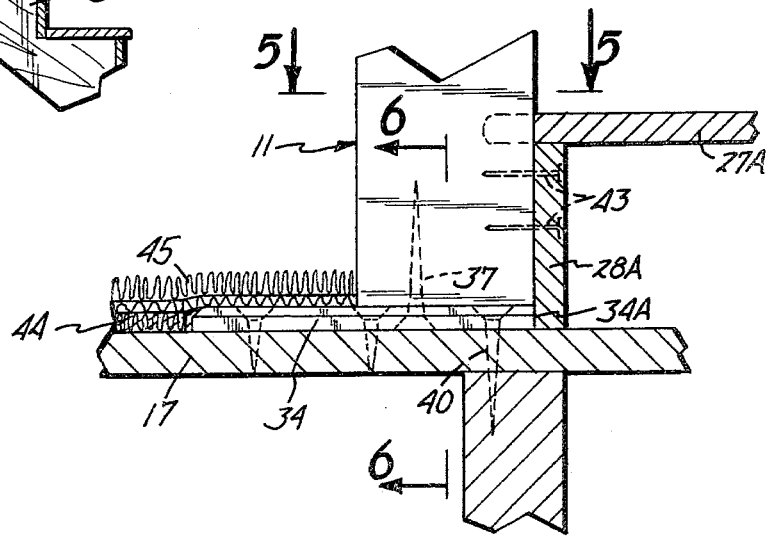

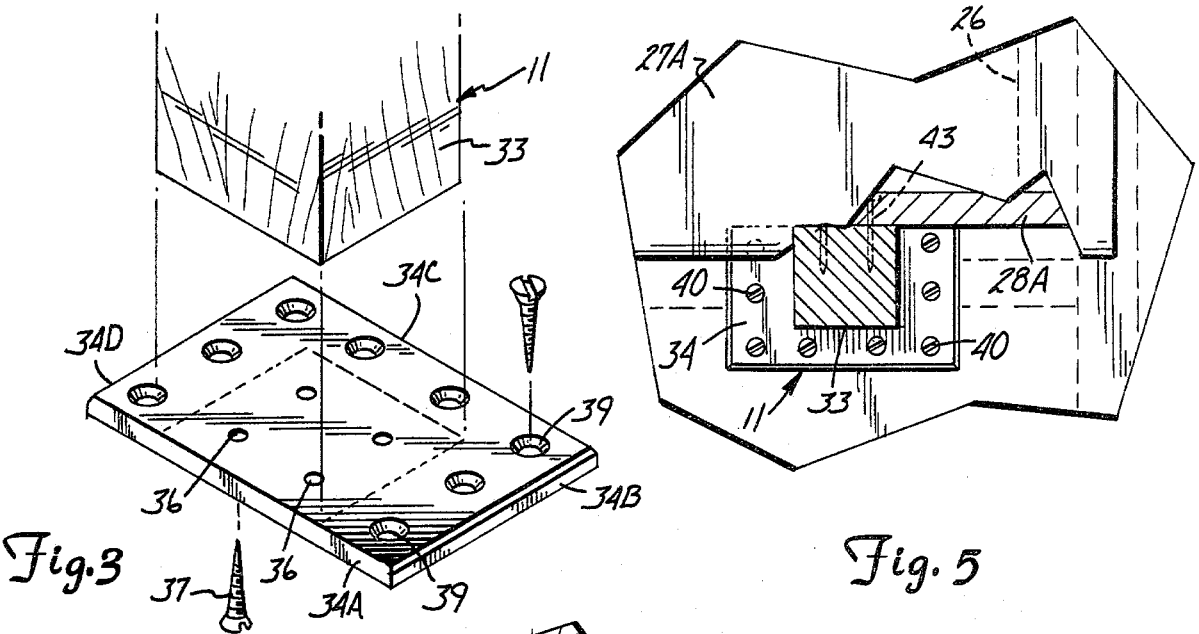
Fig. 3
Fig. 5
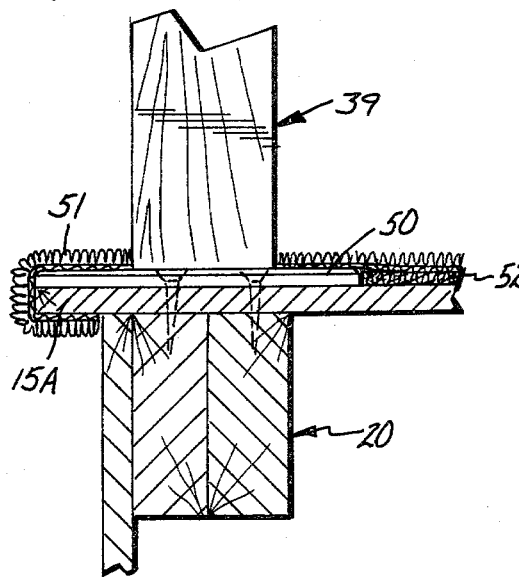
Fig. 7
Fig. 6
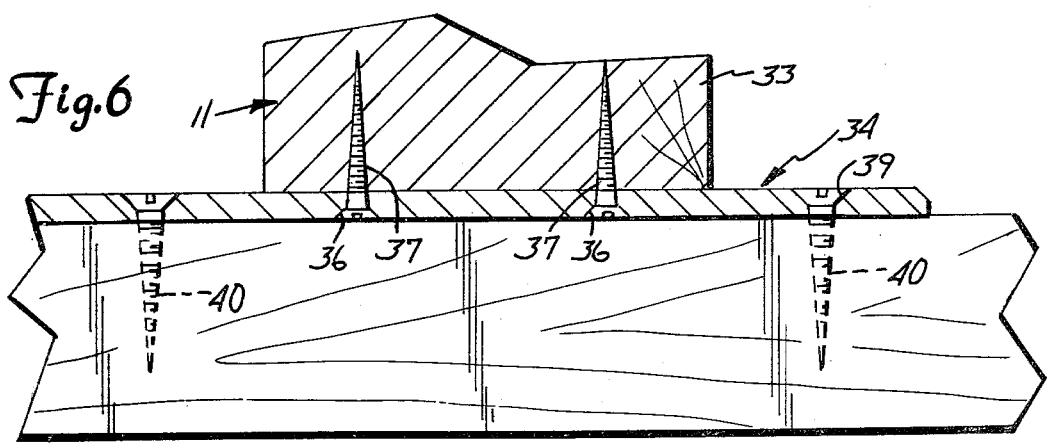

4,295,638

NEWAL POST ASSEMBLY

SUMMARY OF THE INVENTION

The invention pertains to the newal post assembly to support a rail assembly such as a stairway handrail. In the prior art, newal posts are fastened to a floor by installation in a hole cut through the floor. Bracing is placed between floor joists located proximate the intended location of the newal post, and the lower end of the newal post is secured to the bracing. Where floor joists cross beneath the intended location of the newal post, or where there is a finished ceiling beneath the floor of the intended location of the newal post thereby limiting access to the floor joists, this method cannot be employed. Generally then, a hole is cut just through the subfloor and the newal post is fastened therein as best as can be done with shims, toenail fasteners, and the like.

The present invention pertains to a newal post assembly to locate a newal post at any desired or necessary location in a sturdy and secure manner. The assembly includes a newal post for intended use in an upright disposition for connection to a railing, and a newal post anchor plate or base assembled to the bottom or foot of the newal post. The newal post is assembled to the anchor plate with an edge of the newal post in alignment with one edge of the anchor plate to permit assembly of the newal post flush against a wall. A first set of holes is provided for assembly of the newal post anchor plate to the bottom or foot of the newal post. Fasteners such as screws extend upwardly through holes provided in the bottom surface of the anchor plate into the newal post. A second set of holes is provided in the anchor plate for fastening the anchor plate to a floor or other floor structures such as floor joists. Fasteners such as screws are provided which extend downwardly from the upper surface of the plate into the floor or floor support structure. The newal post is thus held firmly and securely in position. The second set of holes are spaced accordingly so that usually solid floor support structure can be contacted by way of one of the fasteners in order to insure that the anchor plate is held firmly and securely. The anchor plate is relatively thin and thus can be easily covered by carpeting and does not produce an unsightly bulge.

IN THE DRAWINGS

FIG. 1 is a top plan view of a split level staircase with portions removed for purposes of illustration and having newal post assemblies according to the present invention;

FIG. 2 is an enlarged side elevational view of a portion of the staircase of FIG. 1 taken along the line 2—2 thereof;

FIG. 3 is an enlarged assembly view of a newal post assembly according to the invention;

FIG. 4 is an enlarged side elevational view of one of the newal post assemblies shown in FIG. 2;

FIG. 5 is a sectional view of a newal post assembly of FIG. 4 taken along the line 5—5 thereof;

FIG. 6 is another sectional view of the newal post assembly of FIG. 4 taken along the line 6—6 thereof;

FIG. 7 is a side elevational view of one of the newal post assemblies shown in FIG. 1 taken along the line 7—7 thereof.

DESCRIPTION OF PREFERRED EMBODIMENT

Referring to the drawings, there is shown in FIGS. 1 and 2 a staircase 10 equipped with a plurality of newal post assemblies according to the present invention indicated at 11, 12 and 13. Staircase 10 is installed in a residential unit of the split level variety having upper floor 15 with a first stairway 16 leading downward to an intermediate floor on landing 17. A second stairway 18 leads from the landing 17 down to the lower floor.

Upper floor 15 is supported by a plurality of floor joists in conventional fashion. Double joist assemblies are used in straddling relationship to stairway openings. The opening for stairway 10 is straddled by double joist assemblies 20, 21. A header joist 22 extends between double joist assemblies 20, 21 at the threshold of staircase 10 to a rim joist 25.

As shown in FIG. 2, first stairway 16 includes a plurality of elongate, notched stair support beams 26 diagonally extended between header joist 22 and landing 17. Horizontal treads 27 are disposed between the horizontal surfaces of notched beams 26 to form the horizontal stairway treads. Vertical risers 28 are fixed to the vertical portion of the notches of the stairway beams 26 and extend between beams 26 to form the stairway risers. The stairway treads overlap and extend outward beyond the stairway risers. First newal post assembly 11 is located at the base of stairway 16, and second newal post assembly 12 is located at the upper end of stairway 16. A diagonal handrailing 30 extends between first and second newal post assemblies 11, 12. As shown in FIG. 1, a third newal post assembly 13 located at the top of stairway 16 opposite the second newal post assembly 12. Stairway 16 is partially open, whereby a second railing 31 extends from the third newal post assembly 13 to a studwall 32. Second railing 31 is horizontal and serves to guard the stairway opening formed by the first stairway 10.

The first, second and third newal post assemblies 11, 12 and 13 are identical in construction and are shown at different locations in FIGS. 1 and 2 to illustrate versatility of the assembly.

As shown in FIGS. 2 and 4, first newal post assembly 11 includes a wooden newal post 33 assembled to a flat anchor plate or base 34. Referring to the assembly drawing of FIG. 3, base 34 is a generally rectangular flat metal member having first, second, third and fourth edges 34A, B, C, D orientated in perpendicular relationship with edges 34A and C being parallel to one another and perpendicular to the second and fourth edges 34B, D. Base 34 has a first array of symetrically spaced strategically located interior openings or holes 36. Holes 36 are upwardly countersunk from a first or lower side of plate 34 or from the side of plate 34 in engagement with the floor when installed as shown in FIGS. 4 and 6. First flat head screws 37 pass upwardly through the holes 36 and are secured in the lower end of newal post 33 to securely attach the newal post 33 and base 34. Newal post 33 can have a standard three to three and one-half inch square base (7.6 to 8.9 cm.) with a transverse bottom surface that will cover the pattern formed by holes 36. Holes 36 can, for example, form a 1¾ inch square pattern (4.4 cm.). The holes 36 are centrally located between the second and fourth edges 34B, D but are more closely orientated to the first edge 34A than its corresponding parallel edge 34C. Holes 36 are thus orientated whereby installation of the newal post 33 with respect to the holes 36 can be accomplished with a surface of the newal post 33 flush with the edge 34A, of plate 34 permitting mounting of the newal post 33 with one side flush to the vertical surface. A second array or exterior set of strategically located holes is formed by holes 39 which encompass the first array of holes 36 along three edges 34B, C, and D of plate 34. The holes 39 are generally aligned in parallel relationship to the second, third and fourth edges 34B, C, D of plate 34 and lie along the perimeter of plate 34 at an area unoccupied by the base of the newal post 33 when assembled by the screws 37. As shown, eight holes 39 are provided, one at each corner of base 34, an additional one intermediate along the second and fourth edges 34B, D, and two additional holes 39 intermediate along the third edge 34C of plate 34. The second holes 39 are downwardly countersunk from the second or upper side of plate 34. The first and second arrays of holes 36, 39 together form a matrix of three rows of holes parallel to first edge 34A. A first row of holes adjacent first edge 34A is comprised of outer holes 39 downwardly countersunk from the top or second side of plate 34, and two intermediate holes 36 upwardly countersunk from the first or lower side of plate 34. The second row of holes is approximately midway between first and third edges 34A, 34C and also comprises outer holes 39 downwardly countersunk from the top or second side of plate 34, and two intermediate holes 36 upwardly countersunk from the first or lower side of plate 34. The third row of holes comprises a row of four holes 39 adjacent third edge 34C and all downwardly countersunk from the top or second side of plate 34. As shown in FIG. 6, second holes 39 accommodate a second set of screws 40. Second screws 40 secure the base 34 with respect to an underlying surface 41 with the newal post 33 fastened to the upper side of base 34 by the first screws 36. The second holes 39 are strategically spaced about the base 34 in such a fashion that when the base 34 is mounted in the vicinity of an underlying floor joist, at least one of the holes 39 will overlie the joist to permit fastening thereto. The length of first and third edges 34A, C can be approximately six inches (15 cm.). With newal post 33 centered thereon, there will be approximately 1½ (3.8 cm.) inches between either side of newal post 33 and corresponding second and fourth edges 34B, D of plate 34. Second and fourth edges 34B, D can be approximately five inches (12.7 cm.). One surface of the newal post 33 will be flush with the first edge 34A and there will be approximately a two inch overhang between the third edge 34C and the corresponding surface of newal post 33.

As shown installed in FIGS. 2 and 4, first newal post assembly 11 is installed on the floor of landing 17 with the first edge 34A of plate 34 flush to the last step riser 28A. The corresponding side of newal post 33 is also being flush with respect to the last or lowest riser 28A. The overhang of the last stair tread 27A is notched out to accommodate the upwardly extending portion of newal post 33. A first set of screws 37 fastens the newal post 33 securely to the base 34. Second screws 40 extend downwardly into landing 17 at that location. For example, there can be a second header joist 42 located beneath the lowermost riser 28A in supportive relationship to the landing 17. The holes 39 located at the corners of the first and fourth edges 34A, 34D and first and second edges 34A, 34B of base 34 are disposed over the second header 42 such that screws 40 engaged in these holes will intercept the second header 42. Additional fasteners such as nails 43 can be driven through the side of the lowermost stair riser 28A and into the abutting surface of the newal post 33 to give the newal post assembly 11 additional support. Carpeting 45 is extended over the exposed portion of base 34 extending beyond the foot of the newal post 33. As the base 34 is relatively thin, for example ¼ inch gauge steel, the rise occurring in the carpet 45 as it passes over the second edge 34B of base 34 is slight. A carpet pad 44 can underlie carpet 45 and extend to the edge of base 34 whereby any noticeable bumps in carpet 45 where it covers base 34 are minimal. Floor 17 is depicted as wooden but could be of other material such as concrete wherein concrete anchors or screws would be usable to fasten base 34.

Second newal post assembly 12 is located at the top of the first stairway 16 and includes a wooden newal post 46 fastened to a flat metal base 47. The upper portion of the newal post 46 is connected to the upper portion of the first newal post 33 by diagonal handrail 30. Base 47 of second newal post assembly 12 is the same as the base 34 of first newal post assembly 11. One side of newal post 46 is mounted flush with a side or edge of the base 47 and that edge is disposed over the header beam 22 such that adjacent exterior holes can be used for holding screws to be secured in the header 22. In addition, the line of exterior holes disposed along the opposite edge of base 47 is such that one of them will be disposed over the intermediate joist 23 where it intercepts the header joist 22 for fastening thereto.

Third newal post assembly is mounted adjacent the open stairwell and is connected to the horizontal railing 31 guarding the open stairwell. As shown in FIG. 7, the third newal post assembly includes a wooden newal post 49 connected to a flat metal base 50. Base 50 is of the same construction as base 34 of the first newal post assembly 11. Third newal post assembly 13 is located directly over the double joist assembly 20 that straddles the stairwell 10 such that screws passing through central exterior holes in the base 50 pass directly into the joist 20 to securely hold the third newal post assembly 13 in place. At the location of the double joist 20, the floor 15 overlaps or overhangs as at 15A into the area of stairwell 10. This overhang is typically a distance of 1½ to 2 inches (3.8+5 cm.) With a three-inch square newal post 49, the distance between the side of the newal post and the outer edge of the plate is 1½ inches. The base 50 is nicely accommodated over the joists 20 and does not extend beyond the overlap 15A of floor 15. A carpet 51 is laid in covering relationship to the floor 15 and base 50 of newal post assembly 13 and is turned over and under the overlapping portion of 15A of floor 15 and secured thereunder. A carpet pad 52 lies under carpet 51 and terminates at the edge of base 50.

While there has been shown and described one embodiment of a newal post assembly according to the invention, it will be apparent that variations and deviations can be had from the embodiments shown without departing from the scope and spirit of the invention.

The embodiments of the invention in which an exclusive property or privilege is claimed are defined as follows:

1. A newal post assembly for installation with respect to a floor type surface comprising:
    an elongate wooden newal post for intended use in a generally upright orientation and having a transverse bottom surface;
    a newal post base comprised as a metal plate member generally rectangular in shape defined by first, second, third and fourth edges respectively and having top and bottom sides with transverse dimensions greater than the bottom surface of the newal post;

a first set of mounting holes in said plate member, said bottom surface of the newal post being positioned over said first set of mounting holes in surface contact with the upper side of the plate member, and a first set of linear fastening members extended from the bottom side of the plate member upwardly through the first holes into the bottom surface of the newal post to secure the newal post with respect to the base, said first set of mounting holes being positioned near the first of said edges centrally between adjacent edges and positioned to orientate a side of the newal post in flush relationship with said edge;

a second set of mounting holes located in said plate member and located proximate the second, third and fourth edges of said plate member in surrounding relationship to said newal post, and second linear fastening means extending from the upper surface of said plate member through the second set of mounting holes with respect to the floor type surface.

said holes of the first and second sets of holes being generally arranged in three rows on said plate member, a first row being disposed adjacent the first edge of said plate member and having two outer holes from said second set of holes and two intermediate holes from said first set of holes disposed centrally between the outer holes, a second row disposed intermediate between the first and third edges of said plate member and having two outer holes from said second set of holes and two intermediate holes from said first set of holes disposed centrally between the two outer holes, and a third row of holes disposed adjacent the third edge of said plate member comprised of four spaced apart holes from said second set of holes.

2. The newal post assembly of claim 1 wherein: said first set of mounting holes are countersunk on the bottom side of said plate member, said first linear fastening members comprising a first set of screws; said second mounting holes being countersunk from the top side of said plate member, said second linear mounting members comprising a second set of screws.

3. The newal post assembly of claim 1 or 2 wherein: said first edge flush relationship with a side of said newal post is approximately six inches long, said edges perpendicular to the first edge being approximately five inches long.

4. A newal post assembly for installation with respect to a floor type surface comprising:

a first elongate wooden newal post for intended use in a generally upright orientation and having a transverse bottom surface;

a newal post base comprised as a metal plate member generally rectangular in shape defined by first, second, third and fourth edges respectively and having top and bottom sides with transverse dimensions greater than the bottom surface of the newal post;

a first set of mounting holes in said plate member, said bottom surface of the first newal post being positioned over said first set of mounting holes in surface contact with the upper side of the plate member, and a first set of linear fastening members extended from the bottom side of the plate member upwardly through the first holes into the bottom surface of the newal post to secure the first newal post with respect to the base, said first set of mounting holes being positioned near the first of said edges centrally between adjacent edges and positioned to orientate a side of the newal post in flush relationship with said edge;

a second set of mounting holes located in said plate member and located proximate the second, third and fourth edges of said plate member in surrounding relationship to said newal post, and second linear fastening means extending from the upper surface of said plate member with respect to the floor type surface;

a second elongate wooden newal post for intended use in a generally upright orientation and having a transverse bottom surface; a second newal post base comprised as a metal plate member generally rectangular in shape defined by first, second, third and fourth edges respectively and having top and bottom sides and being connected to the transverse bottom surface of the second newal post by fastening means; and a handrail connecting the top portions of the first and second newal posts.

5. A newal post assembly for installation with respect to a floor type surface comprising:

an elongate wooden newal post for intended use in a generally upright orientation and having a transverse bottom surface;

a newal post base comprised as a metal plate member generally rectangular in shape defined by first, second, third and fourth edges respectively and having top and bottom sides with transverse dimensions greater than the bottom surface of the newal post;

a first set of mounting holes in said plate member, countersunk on the bottom side of said plate member, said bottom surface of the newal post being positioned over said first set of mounting holes in surface contact with the upper side of the plate member, and a first set of linear fastening members comprised as a first set of screws extended from the bottom side of the plate member upwardly through the first holes into the bottom surface of the newal post to secure the newal post with respect to the base, said first set of mounting holes being positioned near the first of said edges centrally between adjacent edges and positioned to orientate a side of the newal post in flush relationship with said edge;

a second set of mounting holes located in said plate member and located proximate the second, third and fourth edges of said plate member in surrounding relationship to said newal post, and countersunk on the top side of said plate member, and second linear fastening means comprised as a second set of screws extending from the upper surface of said plate member with respect to the floor type surface;

a lower portion of said newal post fastened to the newal post base being approximately three inches square, said first set of mounting holes comprised as four mounting holes arranged in a square pattern; said second set of mounting holes comprised as a set of eight mounting holes arranged adjacent said second, third and fourth base edges.

6. A newal post base for assembly of a newal post to a floor type surface comprising;

a generally rectangular plate member having first, second, third and fourth edges and having first and second sides comprised as top and bottom sides;

a first set of mounting holes located proximate the first edge and intermediate the second and fourth edges for mounting a newal post, said first set of mounting holes being countersunk on a first side of said plate member;

a second set of mounting holes positioned adjacent the second, third and fourth edges of said plate member in surrounding relationship to the first set of holes for mounting the plate member to a floor type surface, said second set of mounting holes being countersunk on a second side of said plate member; said first set of mounting holes comprised as four mounting holes arranged in a square pattern; said second set of mounting holes comprised as a set of eight mounting holes arranged adjacent said second, third and fourth base edges.

7. A newal post base for assembly of a newal post to a floor type surface comprising:

a generally rectangular plate member having first, second, third and fourth edges and having first and second sides comprised as top and bottom sides;

a first set of mounting holes located proximate the first edge and intermediate the second and fourth edges for mounting a newal post, said first set of mounting holes being countersunk on a first side of said plate member;

a second set of mounting holes positioned adjacent the second, third and fourth edges of said plate member in surrounding relationship to the first set of holes for mounting the plate member to a floor type surface, said second set of mounting holes being countersunk on a second side of said plate member; said holes of the first and second sets of holes being generally arranged in three rows on said plate member, a first row being disposed adjacent the first edge of said plate member and having two outer holes from said second set of holes and two intermediate holes from said first set of holes disposed centrally between the outer holes, a second row disposed intermediate between the first and third edges of said plate member and having two outer holes from said second set of holes and two intermediate holes from said first set of holes disposed centrally between the two outer holes, and a third row of holes disposed adjacent the third edge of said plate member comprised of four spaced apart holes from said second set of holes.

8. The newal post base of claim 7 wherein: the holes of the first set of holes are disposed in a square pattern.

9. The newal post assembly of claim 6, 7, or 8 wherein: said first and third edges are approximately six inches in length and said second and fourth edges are approximately five inches in length and said plate member is approximately ¼ inch thick.

* * * * *